(12) United States Patent
Nun et al.

(10) Patent No.: US 8,105,656 B2
(45) Date of Patent: Jan. 31, 2012

(54) METHOD FOR COATING SUBSTRATES

(75) Inventors: Edwin Nun, Billerbeck (DE); Heike Bergandt, Marl (DE); Hannelore Armoneit, Recklinghausen (DE); Marie-Theres Wilkes, Dorsten (DE); Sigrid Banken, Dorsten (DE); Thomas Schrief, Haltern am See (DE)

(73) Assignee: Evonik Degussa GmbH, Essen (DE)

( * ) Notice: Subject to any disclaimer, the term of this patent is extended or adjusted under 35 U.S.C. 154(b) by 907 days.

(21) Appl. No.: 12/092,086

(22) PCT Filed: Oct. 5, 2006

(86) PCT No.: PCT/EP2006/067082
§ 371 (c)(1),
(2), (4) Date: May 2, 2008

(87) PCT Pub. No.: WO2007/051680
PCT Pub. Date: May 10, 2007

(65) Prior Publication Data
US 2008/0280148 A1    Nov. 13, 2008

(30) Foreign Application Priority Data
Nov. 3, 2005  (DE) .................. 10 2005 052 940

(51) Int. Cl.
*B05D 3/02* (2006.01)
(52) U.S. Cl. .................. 427/387; 427/385.5; 427/384; 427/393.6
(58) Field of Classification Search .................. 427/284
See application file for complete search history.

(56) References Cited

U.S. PATENT DOCUMENTS

| | | |
|---|---|---|
| 2006/0141223 A1 | 6/2006 | Oles et al. |
| 2006/0147675 A1 | 7/2006 | Nun et al. |
| 2006/0156475 A1 | 7/2006 | Oles et al. |
| 2006/0172641 A1 | 8/2006 | Hennige et al. |
| 2008/0020190 A1 | 1/2008 | Nun et al. |
| 2008/0206174 A1 | 8/2008 | Bergandt et al. |
| 2008/0233063 A1 | 9/2008 | Bergandt et al. |
| 2009/0162631 A1 | 6/2009 | Bergandt et al. |
| 2010/0226869 A1 | 9/2010 | Bergandt et al. |

FOREIGN PATENT DOCUMENTS

| | | |
|---|---|---|
| EP | 0 916 411 | 5/1999 |
| EP | 1 160 295 | 12/2001 |
| WO | WO2005080684 | * 9/2005 |

OTHER PUBLICATIONS

U.S. Appl. No. 13/002,622, filed Jan. 4, 2011, Bergandt et al.
U.S. Appl. No. 12/067,855, filed Mar. 24, 2008, Nun, et al.
U.S. Appl. No. 12/092,084, filed Apr. 30, 2008, Nun, et al.
U.S. Appl. No. 12/159,103, filed Jun. 25, 2008, Nun, et al.
U.S. Appl. No. 12/094,321, filed May 20, 2008, Nun, et al.
U.S. Appl. No. 12/093,025, filed May 8, 2008, Nun, et al.
U.S. Appl. No. 12/161,031, filed Jul. 16, 2008, Nun, et al.

* cited by examiner

*Primary Examiner* — Necholus Ogden, Jr.
(74) *Attorney, Agent, or Firm* — Oblon, Spivak, McClelland, Maier & Neustadt, L.L.P.

(57) ABSTRACT

The present invention relates to a method of coating a substrate, comprising the steps of
  a) providing a substrate,
  b) applying a composition to at least one side of the substrate, the composition containing an inorganic compound and the inorganic compound containing at least one metal and/or semimetal selected from the group Sc, Y, Ti, Zr, Nb, V, Cr, Mo, W, Mn, Fe, Co, B, Al, In, Tl, Si, Ge, Sn, Zn, Pb, Sb, Bi or a mixture thereof and at least one element selected from the group Te, Se, S, O, Sb, As, P, N, C, Ga or a mixture thereof,
  c) drying the composition applied in step b),
  d) applying at least one coating to the at least one side of the substrate to which the composition was applied in step b), the coating containing a silane of the general formula $(Z^1)Si(OR)_3$, $Z^1$ being R, OR or Gly (Gly is 3-glycidyloxypropyl) and R being an alkyl radical having from 1 to 18 carbon atoms, it being possible for all radicals R to be identical or different, oxide particles selected from the oxides of Ti, Si, Zr, Al, Y, Sn, Zn, Ce or a mixture thereof, a polymer, and an initiator, and
  e) drying the coating applied in step d),
and also to a coated substrate obtainable by the above method.

29 Claims, No Drawings

METHOD FOR COATING SUBSTRATES

The present invention relates to a method of coating substrates and to coated substrates obtainable with the aforesaid method.

Within the art there is a need to alter or improve the surface properties of substrates by means of coating. By means of coatings it is possible in particular to enhance the hardness or the resistance toward aggressive substances. The substrates which are coated may have very different properties. Within the field of building materials a very wide variety of different substrates are known. Appropriate substrates include hard, i.e., inflexible substrates, such as slabs or inflexible tiles, for example. These are installed at a very wide variety of sites, such as a house. However, there is also a very large application sector for flexible building materials. These include, in particular, flexible tiles, which can be used, for example, as a watertight lining for swimming pools. The advantage of the flexible building materials is that they are able to conform to the underlying surface without the need for costly and inconvenient adaptation of the substrate. With flexible building materials it is possible, moreover, to realize shapes which are obtainable only with difficulty, if at all, using rigid building materials.

A requirement of all of these substrates is that they have a surface which must comply with a very wide variety of requirements. One requirement is that they must be resistant toward aggressive chemicals or environmental influences. In other sectors, secondly, it is advantageous for the building materials to have a low soiling propensity.

On the other hand there are also other fields, such as those of wovens and knits, for example, where it is possible to improve surface properties by means of coatings. In this case the stability of an assembly is ensured by means of the underlying substrate, whereas resistance to aggressive substances or else to the soiling propensity is ensured by means of applied coatings.

In the case of flexible substrates it is necessary in particular for applied coatings to be sufficiently flexible to follow any deformation in the flexible substrate without impairment to their structure. If a flexible substrate is bent, stresses occur at the surface of the substrate. These stresses should not, however, lead to any adverse effect on the coating of a substrate, such as cracking, for example.

The prior art, accordingly, discloses methods of applying coatings to flexible substrates without adversely affecting the coating as a result of substrate deformation.

WO 99/15262 discloses a permeable composite. In that case a coating is applied to a permeable support and is subsequently cured. The coating contains an inorganic component, the inorganic component having at least one compound of a metal, semimetal or mixed metal with at least one element from main groups three to seven of the Periodic Table. The coating composition may be obtained by hydrolysis of a precursor. In this operation it is possible for a sol to be formed, which is subsequently applied to the permeable substrate. The permeable composites disclosed in WO 99/15262 are notable for the fact that even at very small radii of curvature of the composite there is no deterioration in the applied coating.

There exists, however, a further need to influence the surface properties of flexible substrates of this kind. Influencing substrates in this way can be accomplished, for example, by means of coatings applied by the sol-gel method. With the sol-gel coatings disclosed in the prior art, however, the problem is apparent that they can be applied only in relatively thin layer thicknesses. Moreover, the prior-art sol-gel coatings are not suitable for application to flexible substrates, since they form cracks on mechanical deformation of the substrate. As a result of this cracking the complete protection of the substrate by the coating is no longer ensured. Instead, aggressive substances can reach the substrate through the cracks that have formed, and are able to affect it adversely.

In particular it is not possible with the prior-art methods to apply sol-gel coatings with a high layer thickness to flexible substrates.

The technical problem on which the present invention is based is that of providing coated substrates which have a coating that reliably protects the substrate against environmental influences, it also being possible for the substrate to be flexible, and the coating being not adversely influenced by deformation of the substrate. A further problem addressed by the present invention is that of providing a method of providing improved substrates of this kind.

The technical problem addressed by the present invention is solved by a method of coating substrates, comprising the steps of a) providing a substrate,
b) applying a composition to at least one side of the substrate, the composition containing an inorganic compound and the inorganic compound containing at least one metal and/or semimetal selected from the group Sc, Y, Ti, Zr, Nb, V, Cr, Mo, W, Mn, Fe, Co, B, Al, In, Tl, Si, Ge, Sn, Zn, Pb, Sb, Bi or a mixture thereof and at least one element selected from the group Te, Se, S, O, Sb, As, P, N, C, Ga or a mixture thereof,
c) drying the composition applied in step b),
d) applying at least one coating to the at least one side of the substrate to which the composition was applied in step b), the coating containing a silane of the general formula $(Z^1)Si(OR)_3$, $Z^1$ being R, OR or Gly (Gly is 3-glycidyloxypropyl) and R being an alkyl radical having from 1 to 18 carbon atoms, it being possible for all radicals R to be identical or different, oxide particles selected from the oxides of Ti, Si, Zr, Al, Y, Sn, Zn, Ce or a mixture thereof, a polymer, and an initiator, and
e) drying the coating applied in step d).

The method of the present invention is not limited to any specific substrates. The substrates may include both open-pored substrates and closed-pored substrates.

In particular the substrate in step a) may be a flexible and/or rigid substrate. In one preferred embodiment the substrate of step a) is a knit, a woven, a mesh, a film, a sheet and/or a metal panel.

The substrate in step a) is preferably substantially temperature-stable at a temperature greater than 100° C. The substrate in step a) is preferably substantially temperature-stable under the drying conditions of steps c) and/or e).

In one preferred embodiment the inorganic compound of step b) is selected from $TiO_2$, $Al_2O_3$, $SiO_2$, $ZrO_2$, $Y_2O_3$, BC, SiC, $Fe_2O_3$, SiN, SiP, alumosilicates, aluminum phosphates, zeolites, partially exchanged zeolites, and mixtures thereof. Examples of preferred zeolites include ZSM-5, Na-ZSM-5 and Fe-ZSM-5, and amorphous microporous mixed oxides, which may contain up to 20 percent of nonhydrolyzable organic compounds, such as vanadium oxide-silicon oxide glass or aluminum oxide-silicon oxide-methylsilicon sesquioxide glasses.

The inorganic compound of step b) preferably has a particle size of from 1 nm to 10 000 nm. It can be advantageous for the composite of the invention to have at least two particle-size fractions of the at least one inorganic compound. It may also be advantageous for the substrate of the invention to have at least two particle-size fractions of at least two inorganic compounds. The particle size ratio can be from 1:1 to 1:10

000, preferably from 1:1 to 1:100. The quantitative ratio of the particle-size fractions in the composition of step b) can be preferably from 0.01:1 to 1:0.01. The composition of step b) is preferably a suspension which is preferably an aqueous suspension. The suspension may preferably feature a liquid selected from water, alcohol, acid or a mixture thereof.

In a further-preferred embodiment the inorganic compound of step b) may be obtained by hydrolyzing a precursor of the inorganic compound containing the metal and/or semimetal. Said hydrolyzing may take place by means of water and/or alcohol, for example. In the course of the hydrolysis it is possible for an initiator to be present, which is preferably an acid or base, which is preferably an aqueous acid or base.

The precursor of the inorganic compound is preferably selected from metal nitrate, metal halide, metal carbonate, metal alkoxide, semimetal halide, semimetal alkoxide or a mixture thereof. Examples of preferred precursors include titanium alkoxides, such as titanium isopropoxide, silicon alkoxides, such as tetraethoxysilane, and zirconium alkoxides. Preferred metal nitrates are, for example, zirconium nitrate. In one advantageous embodiment, with respect to the hydrolyzable precursor, based on the hydrolyzable group of the precursor, there is at least half the molar ratio of water, water vapor or ice present in the composition.

In one preferred embodiment the composition of step b) is a sol. In one preferred embodiment it is possible to use commercially customary sols, such as titanium nitrate sol, zirconium nitrate sol or silica sol, for example.

The drying of the composition in step c) is carried out preferably by heating to a temperature of from 50° C. to 1000° C. In one preferred embodiment drying takes place for from 10 minutes to 5 hours at a temperature of from 50° C. to 100° C.

In another preferred embodiment drying in step d) takes place for from 1 second to 10 minutes at a temperature from 100° C. to 800° C.

The drying of step c) may take place by means of heated air, hot air, infrared radiation, microwave radiation or electrically generated heat.

In one preferred embodiment R in the general formula $(Z^1)Si(OR)_3$ is an alkyl radical having 1, 2, 3, 4, 5, 6, 7, 8, 9, 10, 11, 12, 13, 14, 15, 16, 17 and/or 18 carbon atoms.

In one preferred embodiment the coating of step d) contains a second silane of the general formula $(Z^2)_zSi(OR)_{4-z}$, R being an alkyl radical having from 1 to 8 carbon atoms and $Z^2$ being $H_aF_bC_n$, a and b being integers, it being possible for all radicals R to be identical or different, a+b being 1+2n, z being 1 or 2 and n being from 1 to 16, or, where $Z^1$ is Gly, $Z^2$ being Am (Am is 3-aminopropyl) with z being 1. Preferably n is 1, 2, 3, 4, 5, 6, 7, 8, 9, 10, 11, 12, 13, 14, 15 and/or 16. In a preferred embodiment R in the general formula $(Z^2)Si(OR)_3$ is an alkyl radical having 1, 2, 3, 4, 5, 6, 7, 8, 9, 10, 11, 12, 13, 14, 15 and/or 16 carbon atoms.

In a further-preferred embodiment the coating of step d) contains 3-glycidyloxypropyltriethoxysilane and/or 3-glycidyloxypropyltrimethoxysilane as silane and/or 3-aminopropyltrimethoxysilane and/or 3-aminopropyltriethoxysilane as second silane. Preferably the coating of step d) contains tetraethoxysilane as silane and as second silane contains a silane of the formula $(H_aF_bC_n)_zSi(OR)_{4-z}$, a and b being integers, a+b being 1+2n, z being 1 or 2, n being from 1 to 16, and it being possible for all radicals R to be identical or different, all radicals R preferably being identical and containing from 1 to 6 carbon atoms.

With further preference the coating of step d) contains tetraethoxysilane, methyltriethoxysilane, octyltriethoxysilane and/or hexadecyltrimethoxysilane as silane and/or 3,3,4,4,5,5,6,6,7,7,8,8,8-tridecafluorooctyltriethoxysilane as second silane.

In one preferred embodiment the coating of step d) contains as initiator an acid or base which is preferably an aqueous acid or base.

The surface of the oxide particles contained in the coating of step d) is preferably hydrophobic. On the surface of the oxide particles of the coating of step d) there are preferably organic radicals $X_{1+2n}Cn$ attached to silicon atoms, n being from 1 to 20 and X being hydrogen and/or fluorine. The organic radicals may be identical or different. Preferably n is 1, 2, 3, 4, 5, 6, 7, 8, 9, 10, 11, 12, 13, 14, 15, 16, 17, 18, 19 and/or 20. The groups attached to silicon atoms are preferably methyl, ethyl, propyl, butyl and/or pentyl groups. In one particularly preferred embodiment trimethylsilyl groups are attached to the surface of the oxide particles. The organic radicals can preferably be eliminated and with further preference can be hydrolyzed.

The oxide particles of the coating of step d) may be selected from the oxides of Ti, Si, Zr, Al, Y, Sn, Zn, Ce or contain mixtures thereof. The oxide particles of the coating of step d), under the reaction conditions of step d), are preferably partly hydrolyzed at the surface of the oxide particles. This is accompanied by the formation preferably of reactive centers which react with the organic silicon compounds of the coating of step d). These organosilicon compounds may be bonded covalently to the oxide particles during the drying of step e), by means of —O— bonds for example. This covalently crosslinks the oxide particles with the coating as it cures. The layer thickness of the coating as it cures can therefore, surprisingly, be increased further.

The oxide particles may have an average size of from 10 to 1000 nm, preferably from 20 to 500 nm, more preferably from 30 to 250 nm. If the coating is to be transparent and/or colorless, then the only oxide particles used are preferably those having an average size of from 10 to 250 nm. The average particle size refers to the size of the primary particles or, if the oxides are in the form of agglomerates, to the size of the agglomerates. The particle size is determined by light scattering methods, using an instrument of the type HORIBA LB 550® (from Retsch Technology), for example.

In the coating of step d) the polymer preferably has an average mass-average molecular weight of at least 3000 g/mol. The average mass-average molecular weight is preferably at least 5000 g/mol, more preferably at least 6000 g/mol, and most preferably at least 10 000 g/mol.

The polymer of the coating of step d) preferably has an average degree of polymerization of at least 50. In a further-preferred embodiment the average degree of polymerization is at least 80, more preferably at least 95, and most preferably at least 150. The polymer of the coating of step d) is preferably selected from polyamide, polyester, epoxy resins, melamine-formaldehyde condensate, urethane-polyol resin or mixtures thereof.

The amount of the coating applied to the substrate in step d) is preferably such that, after drying in step e), the substrate bears a layer of the dried coating having a layer thickness of from 0.05 to 10 μm. The dried substrate preferably bears a coating of step d) having a layer thickness of from 0.1 μm to 9 μm, more preferably from 0.2 μm to 8 μm, and most preferably from 0.3 μm to 7 μm.

The drying of the coating in step e) can be carried out by any process known to the skilled worker. In particular the drying can be carried out in an oven. Further preference is given to drying with a hot air oven, forced air oven, microwave oven or by means of infrared irradiation. In particular it is possible with preference to carry out the drying with the processes and the drying times of step c). In one preferred embodiment the coating of step e) is dried by heating to a temperature of from 50° C. to 1000° C.

In a further-preferred embodiment the application of the coating in step b) and/or d) may be preceded by the application of at least one further coating. This further coating may be a print, for example. A print of this kind can be applied by any printing process familiar to the skilled worker, in particular by the offset printing process, flexographic printing processes, pad printing, or inkjet printing processes.

In a further embodiment the application of the coating in step d) may be followed by application of at least one further coating. There is no restriction on this further coating, and it may be any coating known to the skilled worker. This coating in particular may also be a print. In this case as well the print can be applied by any process familiar to the skilled worker, in particular by the offset printing process, flexographic printing processes, pad printing, and inkjet printing processes.

Coated substrates of the present invention surprisingly exhibit a very high flexibility. If a substrate is flexible then it can be bent without destruction or tearing of the applied coatings. In particular it is therefore possible to apply coatings to flexible tiles which conform to the surface contour of a base without detrimental effect on the coating. As a coating it is possible, as already outlined, to apply any of a very wide variety of protective coats, particularly coats providing protection from aggressive chemicals, or dirt-repellent coatings.

Furthermore it is found, surprisingly, that with the method of the present invention it is possible to apply relatively thick coatings, avoiding application in a multiple coating method. This proves to be an advantage in particular when scratchproof coats are applied to polymeric sheets. It is surprising, moreover, that the coated substrate of the present invention is reversibly stretchable and scourable.

The present invention further provides the coated substrate obtainable with the aforesaid method.

EXAMPLES

Inventive Example

Preparation of the Composition:

A stirred vessel is charged with 674.56 g of distilled water, 271.48 g of ethanol (96% form) and 93.376 g of concentrated nitric acid. Added to this mixture with stirring are 11.97 g of Dolapix CE 64 (organic dispersant and liquefier (polyelectrolyte) for liquefying oxide ceramic; manufacturer: Zschimmer & Schwarz GmbH & Co. KG, D-56112 Lahnstein (DE)).

Incorporated into the mixture subsequently, in succession, are 518.04 g each of aluminum oxides MZS 1 and MZS 3 from Martinswerke, and the mixture obtained is subsequently stirred for 12 hours.

The dispersion is admixed with 16.66 g of tetraethoxysilane, 16.66 g of methyltriethoxysilane, and 33.32 g of glycidyloxypropyltrimethoxysilane and subsequently stirred for 24 hours.

The dispersion is admixed with 2.117 g of 25% strength ammonia solution and subsequently the dispersion is applied to a PET web (nonwoven polyethyleneterephthalate web, Freudenberg FK 22345) in an amount such that after drying the coat weight is 220 g/m². The applied composition is first dried at room temperature and then heated in an oven at 220° C. for 10 seconds.
Production of the Coating:

In 626 g of glycidyloxypropyltrimethoxysilane, 26.5 g of Aerosil® R812S (Degussa AG; silicon dioxide modified on the surface with trimethylsilyl groups) are dispersed. Introduced into the dispersion with stirring are 241 g of bisphenol A and 31.8 g of 1% strength hydrochloric acid. The resulting mixture is stored at 6° C. for 24 hours.

Subsequently 150.36 g of the mixture are admixed with 3.45 g of methylimidazole and 15.39 g of Bakelite EPR 760 (epoxy resin) with stirring. The mixture is subsequently stirred for 20 hours.

20 g/m² (wet) of the coating material obtained are applied using a doctor blade to the side of the PET web to which the composition has already been applied. Subsequently the coated web is dried at 120° C. for 30 minutes.

The coated PET web exhibits very high flexibility when bent. The applied layers do not flake off. Moreover, the coated PET web is very scratchproof, reversibly stretchable and scour-resistant. The surface obtained is smooth, crack-free, and glossy. In addition it is found that the pot life of the coating composition of the invention is significantly extended. Consequently the coating composition of the invention can be processed more easily and more effectively.

Comparative Example

Preparation of the Composition:

The web is coated with the composition of the inventive example, and dried, in the same way as in the aforesaid inventive example.
Production of the Coating:

Glycidyloxypropyltrimethoxysilane and aminopropyltriethoxysilane are mixed in a molar ratio of 1:1. This mixture is admixed with 1% of concentrated nitric acid and 5% of ethanol.

The coating composition thus obtained is subsequently stirred for 1 hour and 20 g/m² (wet) of the coating composition obtained are applied using a doctor blade to the side of the PET web to which the composition has already been applied. Subsequently the coated web is dried at 120° C. for 30 minutes.

The comparative example shows that the coating obtained has a rough surface with cracks running through it. The coated web cannot be bent without destroying the surface. The pot life of the coating composition of the comparative example, at 2 hours, is very low, which has a detrimental effect on the processing capacity of the coating composition.

invention claimed is:
1. A method of coating a substrate, comprising the steps of
a) providing a substrate,
b) applying a composition to at least one side of said substrate, said composition containing an inorganic compound which contains at least one metal and/or semimetal selected from the group Sc, Y, Ti, Zr, Nb, V, Cr, Mo, W, Mn, Fe, Co, B, Al, In, Tl, Si, Ge, Sn, Zn, Pb, Sb, Bi or a mixture thereof and at least one element selected from the group Te, Se, S, O, Sb, As, P, N, C, Ga or a mixture thereof,
c) drying the composition applied in step b),
d) applying at least one coating to the at least one side of the substrate to which the composition was applied in step b), said coating containing a silane of the general formula $(Z^1)Si(OR)_3$, in which $Z^1$ is R, OR or Gly (3-glycidyloxypropyl) and R is an alkyl radical having from 1 to 18 carbon atoms, wherein all radicals R are identical or different, oxide particles selected from the oxides of Ti, Si, Zr, Al, Y, Sn, Zn, Ce or a mixture thereof, a polymer, and an initiator, and
e) drying the coating applied in step d), wherein said polymer is at least one polymer selected from the group consisting of a polyamide, a polyester, an epoxy resin, a melamine-formaldehyde condensate, a urethane-polyol resin and a mixture thereof.

2. The method according to claim 1 wherein the substrate in step a) is a flexible or rigid substrate.

3. The method according to claim 1, wherein the substrate in step a) is a knit, a woven, a mesh, a film, a sheet or a metal panel.

4. The method according to claim 1, wherein the substrate in step a) is substantially temperature-stable at a temperature greater than 100° C.

5. The method according to claim 1, wherein the substrate in step a) is substantially temperature-stable under the drying conditions of steps c) and/or e).

6. The method according to claim 1, wherein the inorganic compound of step b) is selected from $TiO_2$, $Al_2O_3$, $SiO_2$, $ZrO_2$, $Y_2O_3$, BC, SiC, $Fe_2O_3$, SiN, SiP, alumosilicates, aluminum phosphates, zeolites, partially exchanged zeolites or a mixture thereof.

7. The method according to claim 1, wherein the inorganic compound of step b) has a particle size of from 1 nm to 10 000 nm.

8. The method according to claim 1, wherein the composition of step b) is an aqueous suspension.

9. The process according to claim 1, wherein inorganic compound of step b) is obtained by hydrolyzing a precursor of the inorganic compound containing the metal and/or semimetal.

10. The method according to claim 9, wherein the precursor of the inorganic compound is selected from metal nitrate, metal halide, metal carbonate, metal alkoxide, semimetal halide, semimetal alkoxide or a mixture thereof.

11. The method according to claim 1, wherein the composition of step b) contains an initiator.

12. The method according to claim 11, wherein the initiator is an aqueous acid or base.

13. The method according to claim 1, wherein the composition of step b) is a sol.

14. The method according to claim 1, wherein the drying of the composition in step c) is carried out by heating to a temperature of from 50° C. to 1000° C.

15. The method according to claim 1, wherein the coating of step d) contains a second silane of the general formula $(Z^2)_z Si(OR)_{4-z}$, in which R is an alkyl radical having from 1 to 8 carbon atoms and $Z^2$ is $H_a F_b C_n$, wherein a and b are integers, all radicals R are identical or different, a+b equals 1+2n, z is 1 or 2, and n is from 1 to 16, or, where $Z^1$ is Gly, $Z^2$ is Am (3-aminopropyl) with z being 1.

16. The method according to claim 1, wherein the coating of step d) contains 3-glycidyloxypropyltriethoxysilane and/or 3-glycidyloxypropyltrimethoxysilane as the silane and/or 3-aminopropyltrimethoxysilane and/or 3-aminopropyltriethoxysilane as a second silane.

17. The method according to claim 1, wherein the coating of step d) contains tetraethoxysilane as the silane and as a second silane a silane of the formula $(H_a F_b C_n)_z Si(OR)_{4-z}$, in which a and b are integers, a+b equals 1+2n, z is 1 or 2, n is from 1 to 16, and all radicals R are identical or different and contain from 1 to 6 carbon atoms.

18. The method according to claim 1, wherein the coating of step d) contains tetraethoxysilane, methyltriethoxysilane, octyltriethoxysilane and/or hexadecyltrimethoxysilane as the silane and/or 3,3,4,4,5,5,6,6,7,7,8,8-tridecafluorooctyltriethoxysilane as a second silane.

19. The method according to claim 1, wherein the coating of step d) contains as initiator an aqueous acid or base.

20. The method according to claim 1, wherein the surface of the oxide particles contained in the coating of step d) is hydrophobic.

21. The method according to claim 1, wherein on the surface of the oxide particles of the coating of step d) there are organic radicals of the general formula $X_{1+2n} C_n$ attached to silicon atoms, in which n is from 1 to 20 and X is hydrogen and/or fluorine.

22. The method according to claim 1, wherein the polymer of the coating of step d) has an average mass-average molecular weight of at least 3000 g/mol.

23. The method according to claim 1, wherein the polymer of the coating of step d) has an average degree of polymerization of at least 50.

24. The method according to claim 1, wherein the polymer of the coating of step d) is selected from polyamide, polyester, epoxy resins, melamine-formaldehyde condensate, urethane-polyol resin or a mixture thereof.

25. The method according to claim 1, wherein the amount of coating applied to the substrate in step d) is such that after drying in step e) the substrate bears a layer of the dried coating having a layer thickness of from 0.05 to 10 μm.

26. The method according to claim 1, wherein prior to the application of the coating in step b) and/or d) at least one further coating is applied.

27. The method according to claim 1, wherein after the application of the coating in step d) at least one further coating is applied.

28. The method according to claim 1, wherein the drying of the coating in step e) is carried out by heating to a temperature of from 50° C. to 1000° C.

29. A coated substrate produced by a method according to claim 1.

* * * * *